Feb. 19, 1935.   C. H. WERKMAN ET AL   1,991,993
PROCESS FOR PRODUCING PRODUCTS OF FERMENTATION
Filed Oct. 10, 1930   2 Sheets-Sheet 1

Inventors
C. H. Werkman, C. H. Rayburn
and
R. M. Hixon
By M. Talbert Dick
Attorney Patented Feb. 19, 1935

1,991,993

UNITED STATES PATENT OFFICE 1,991,993

PROCESS FOR PRODUCING PRODUCTS OF FERMENTATION

Chester Hamlin Werkman, Clarence Howard Rayburn, and Ralph Malcolm Hixon, Ames, Iowa, assignors to Iowa State College of Agricultural and Mechanical Arts, Ames, Iowa, a corporation of Iowa Application October 10, 1930, Serial No. 487,808

2 Claims. (Cl. 260—120)

The principal object of this invention is to provide a process whereby the time necessary for fermenting a medium is greatly decreased.

A further object of our invention is to provide a process for the fermentation of a liquid medium that greatly increases the size of the inoculation and at the same time eliminates the disadvantage of dilution of the medium as well as the introduction of metabolic products.

A still further object of this invention is to provide a process for the fermentation of a liquid medium whereby the desired product of metabolism of the micro-organisms is produced continuously.

A still further object of our invention is to provide a process for the production of products of fermentation that is economical.

These and other objects will be apparent to those skilled in the art.

Our invention consists in the process hereinafter set forth, pointed out in our claims and illustrated in the accompanying drawings in which:—

Figure 1:
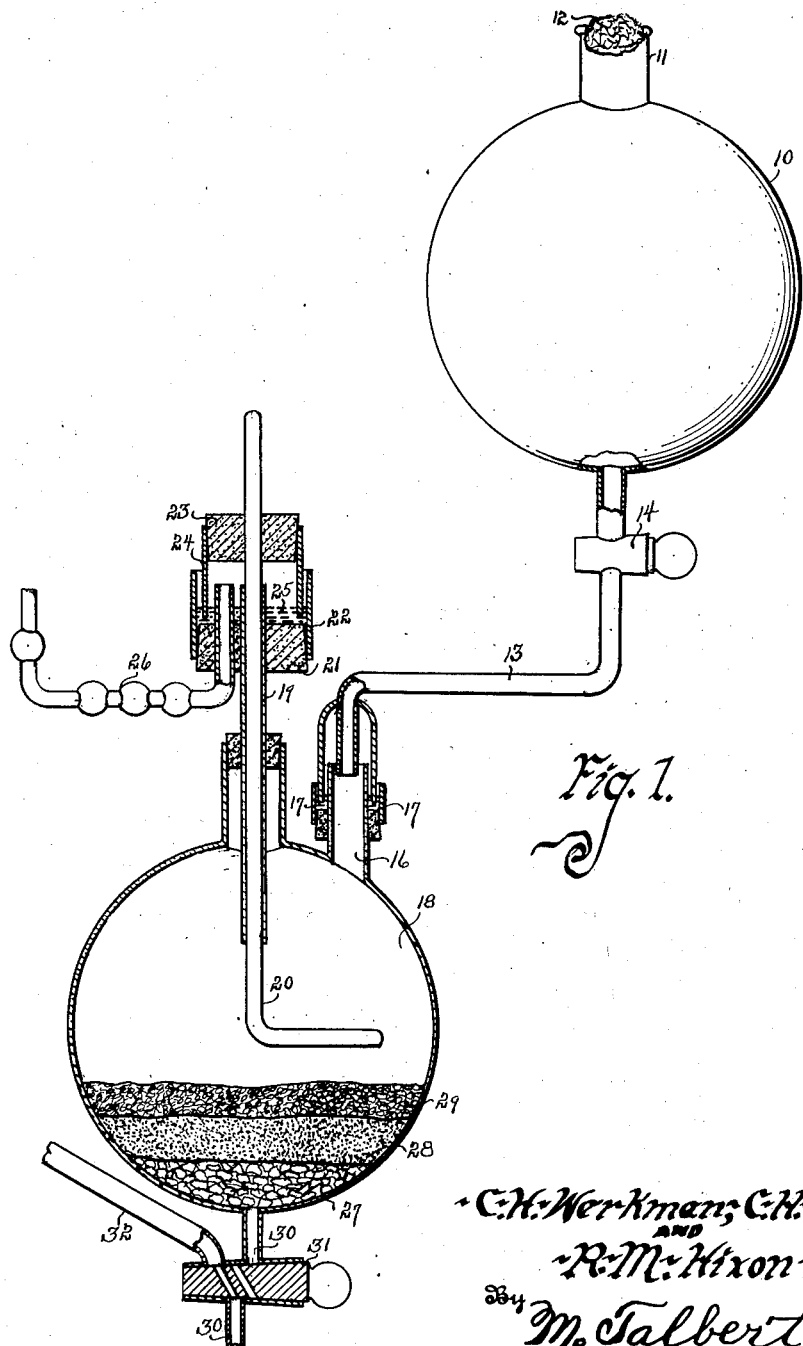
Fig. 1 is a side sectional view of a small apparatus used in a laboratory for obtaining the results outlined in our process.
Figure 2:
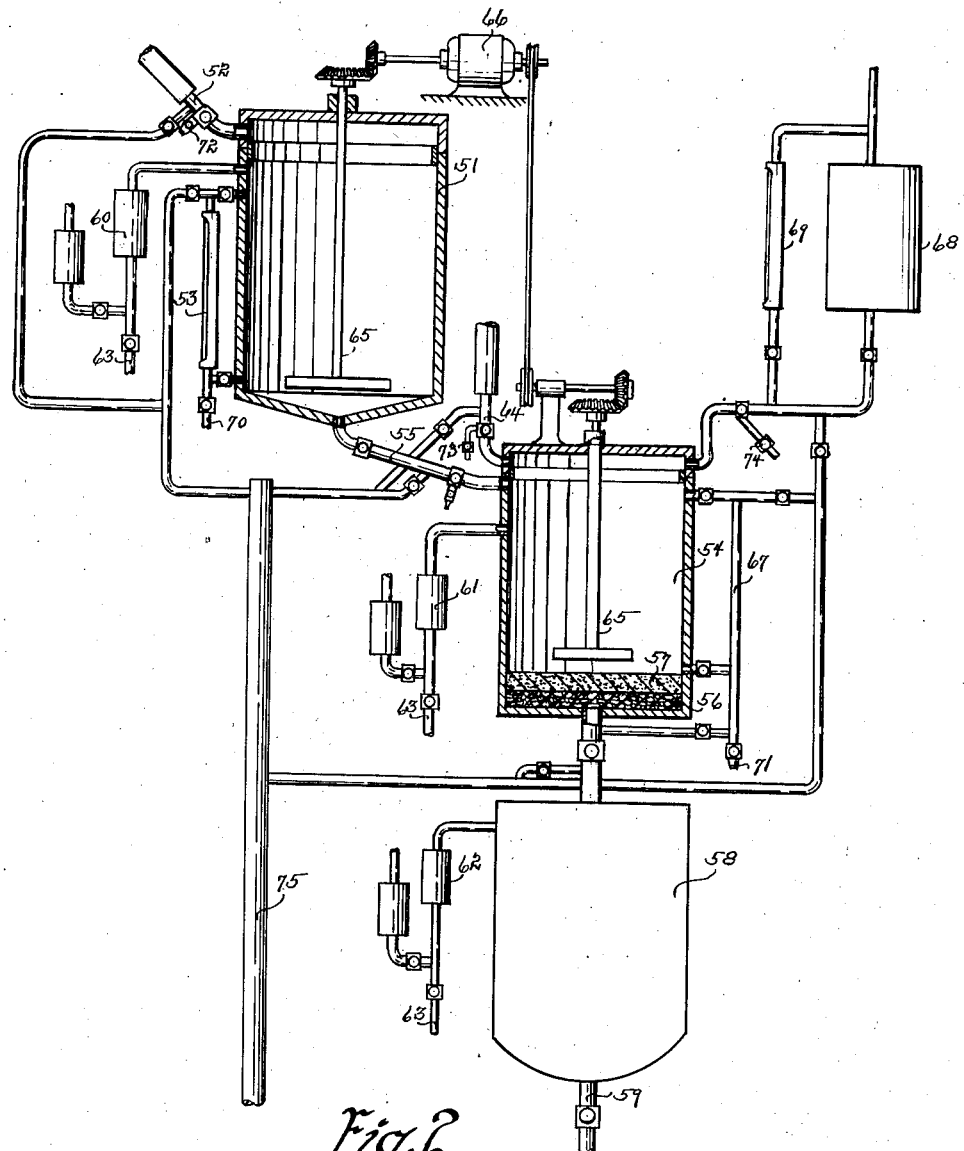
Fig. 2 is a side sectional view of an apparatus to accomplish the desired results that are suitable for the commercial utilization of the process.

As a matter of fact any suitable apparatus may be utilized that will accomplish the process related herein and the two apparatuses shown in Fig. 1 and Fig. 2 are merely illustrative of satisfactory arrangements. Many of the parts of the apparatuses shown in the drawings are illustrated in conventional form.

In the production of chemicals by the use of micro-organisms, generally the material to be fermented is inoculated with a culture of about one-tenth its own volume of actively growing organisms. This method has the disadvantages of diluting the medium to be fermented and at the same time introducing metabolism products which tend to limit the reaction. Even with this large inoculation, in many cases the rate of multiplication of the organism is so slow that commercial utilization of the process is not feasible. Even in those cases capable of commercial utilization, the slowness of the growth requires that many large vats be provided with the necessary piping, etc., which requires a large investment, with its accompanying overhead charge against the process.

We have discovered that the bacteria can be absorbed on a suitable filtering aid and the mother liquor or medium filtered off through a suitable filter.

Fresh medium can then be added to the absorbed bacteria, and after allowing time for growth or fermentation, the filtration can be repeated. It is apparent that the amount of inoculum can be increased up to the absorption limit for the particular bacteria and filtering aid used. It is also apparent that the addition of medium can be either intermittent or continuous.

The objects and advantages of the invention can be best illustrated by the following application to the production of propionic acid from xylose, glucose, or starch by fermentation with the propionic bacteria. The accompanying drawings illustrate diagrammatically apparatuses suitable for the carrying out of the process on either a laboratory or commercial scale. It should be emphasized that these are utilized as examples, only, any organism and suitable apparatus could be utilized to attain the desired objective.

Under the most favorable cultural conditions so far found, the propionic bacteria grow so slowly that a period of more than ten days is necessary to completely ferment the sugars in a two percent solution. Unless heavily inoculated such cultures frequently fail to develop at all or require much longer time than that indicated. Using calcium carbonate as an absorbing agent for these bacteria in conjunction with an apparatus containing a sand filter as described later, it has been possible to filter off the first cultural medium from the bacteria, add fresh medium and after allowing the organism to grow, repeating the filtration until the inoculum became large enough to bring the fermentation to completion in less than twenty-four hours.

The following is a typical example of the progress of the process:

| | Time analyzed | Glucose fermented per 100 cc. of solution | Bacteria per cc. |
|---|---|---|---|
| First medium | 6 days | 1.34 gm | $1.02 \times 10^9$ |
| Second medium | 4 " | 1.40 gm | $2.2 \times 10^9$ |
| Third medium | 2 " | 1.14 gm | $1.8 \times 10^9$ |
| Fourth medium | 2 " | 1.41 gm | $1.8 \times 10^9$ |
| Fifth medium | 2 " | 1.48 gm | $2.4 \times 10^9$ |
| After several runs | 1 " | 2.23 gm | $5.8 \times 10^9$ |

In the above experiment, calcium carbonate was used as an absorbing agent for the bacteria to make possible the filtration.

We will now proceed to briefly discuss the apparatuses shown in the drawings.

In Fig. 1, we have used the numeral 10 to designate a supply flask designed to hold the medium during sterilization. This flask is filled through the neck 11 and is inclosed by a cotton plug 12. The cotton plug 12 prevents the entrance of bacteria into the device. Extending from the bottom of the flask 10 is the outlet pipe 13, interposed in which is a manually operated valve 14. During sterilization, the open end of the pipe 13 may be protected with a cotton plug similar to the cotton plug 12. After sterilization such an inclosing means is removed and its sterile unions is made with the pipe 16 of the fermentation flask as shown in the drawings. This sterile union of the pipe 13 and the pipe 16 may be accomplished by mercury seal 17 which will prevent any outside atmosphere from entering the inside of either of these two pipes or preventing any material that may be in these two pipes from reaching the outside atmosphere at points where these two pipes are joined together.

The pipe 16 extends into and communicates with the inside of the fermentation flask 18. Extending through the upper portion of the flask 18 is a pipe 19. Rotatably mounted in the pipe 19 and extending into the flask 18 is a stirring or agitating rod 20. To prevent any entrance or escape of gas material or the like from or into the flask 18 between the inside of the pipe 19 and the outside of the rod 20, we have provided a mercury seal and the utilization of sterilized inert gas. This is accomplished by the cork or like 21 embracing the portion of the pipe 19 that is on the outside of the flask 18. Embracing this cork and extending considerably above the same is a collar 22. The numeral 23 designates a cork embracing the rod 20 above the collar 22. Embracing the cork 23 or like is a sleeve 24 of less diameter than the diameter of the collar 22 and extending into the same.

In the bottom of the collar 22 is the mercury 25. By this arrangement there is a space between the mercury 25 and the cork or like 23 and into this space the inert gas is introduced thru the pipe or scrubber 26. In the bottom of the flask 18 is a layer of crushed rock or the like 27. Resting on the top of this rock 27 is a strata of sand filter 28 and above this sand strata is a strata of absorbent material 29 as has been hereinbefore explained. It is in the absorbing agent 29 that the bacteria are retained and kept for additional fermentation of additional medium injected into the flask 18 through the flask 10. As we have seen the desired product will filter down through the material 27, 28 and 29 and will pass out of the pipe 30 to a container or like for receiving the same. Interposed in this pipe 30 is a multi-way hand operated valve 31 communicating with the pipe 32. By this arrangement the pipe 30 and the valve 31 may be sterilized by forcing steam or a disinfectant through the pipe 32 and turning the valve 31 to the proper position.

In Fig. 2, we have used the numeral 51 to represent the tank for the preparation of media and sterilization. Extending into the top of this tank is the inlet inoculation pipe 52. The numeral 53 designates a glass gauge for ascertaining the amount of liquid in the tank 51. The numeral 54 designates the fermentation kettle or flask and the numeral 55 designates the pipe leading from the bottom of the tank 51 to the top of the kettle or flask 54. In the bottom of the kettle 54 is the filtering and absorbing material as we have seen heretofore and which we have designated by the numerals 56 and 57.

Communicating with the bottom of the kettle 54 is the receiving container 58 from which a pipe 59 may lead to any desired location. The numerals 60, 61 and 62 designate scrubbers communicating with the tank 51, kettle 54 and receiver 58, respectively. The pipe 63 extending from each of these scrubbers is the waste pipe leading from the same. The numeral 64 designates the inoculation pipe communicating with the inside of the kettle 54. In the tank 51 and kettle 54 is a stirring member 65, each of which is in operative engagement with a prime mover 66. The numeral 67 designates a glass gauge for ascertaining the depth or amount of material in the kettle 54. The numeral 68 designates an alkali reservoir communicating with the inside of the kettle 54 at a point near its top. This last mentioned reservoir has a glass gauge designated by the numeral 69. The numeral 70 designates a pipe leading from the gauge 53 for sampling the material from the tank 51 and the numeral 73 designates a waste valve and pipe communicating with the inside of the inoculation pipe 64. The numeral 74 designates a valve and pipe communicating with the inside of the alkali reservoir 69. In all of these various mentioned pipes, we have positioned manually operated valves as shown in the drawing but which we have not designated by number. In order to keep such a device entirely sterilized we have utilized steam and the numeral 75 designates a pipe designed to lead to a source of steam. Communicating with this pipe 75 and leading to all of the communication pipes, valves, gauges, scrubbers and receptacles of the invention are branch pipes which are also not numbered and in which are manually operated valves for enclosing or opening of the same. If it is desired the filtering material 56 may be a filtros plate.

We claim as our invention:

1. The process of producing propionic acid from a carbohydrate syrup of the class consisting of glucose and xylose syrups by fermentation with propionic bacteria, consisting in introducing the syrup medium and propionic bacteria into a receptacle containing a lower stratum of crushed rock, a superimposed stratum of sand, and a stratum of calcium carbonate above the sand, permitting the syrup medium to ferment, drawing off the cultural medium at a point below the crushed rock in order that the entire medium so drawn off will filter through the said calcium carbonate, sand, and rock and thereby lose and leave a large number of propionic bacteria in the calcium carbonate, and lastly adding fresh syrup medium into the receptacle and to the bacteria retained in the receptacle and calcium carbonate to take the place of the cultured medium drawn off.

2. The process of producing propionic acid from a carbohydrate syrup of the class consisting of glucose and xylose syrups by fermentation with propionic bacteria consisting in introducing the syrup medium and propionic bacteria into a receptacle containng a lower stratum of crushed rock, a superimposed stratum of sand, and a stratum of calcium carbonate above the sand, permitting the syrup medium to ferment, agitating the medium inside the receptacle, drawing off the cultural medium at a point below the crushed rock in order that the entire medium so drawn off will filter through the said calcium carbonate, sand and rock and thereby lose and leave a large number of propionic bacteria in the calcium carbonate, and lastly adding fresh syrup medium into the receptacle and to the bacteria retained in the receptacle and calcium carbonate to take the place of the cultured medium drawn off.

CHESTER HAMLIN WERKMAN.
CLARENCE HOWARD RAYBURN.
RALPH MALCOLM HIXON.